2,942,018
ORGANIC MERCURY COMPOUNDS OF QUATERNARY AMMONIUM SALT TYPE AND THEIR PREPARATION

Kanjiro Kobayashi, Nishinomiya, and Akira Kamada, Sakyo-ku, Kyoto, Japan, assignors to Nagase & Co., Ltd., Osaka, Japan No Drawing. Filed Apr. 3, 1958, Ser. No. 726,063
Claims priority, application Japan Apr. 17, 1957
8 Claims. (Cl. 260—433)

This invention relates to new organic mercury compounds having highly desirable properties as germicides, bactericides or fungicides, and also to compositions for treating materials such as paper, rubber, textiles, leather, plastics, paints, soaps, cosmetics and the like, to render them bacteriostatic and fungistatic. This invention further relates to methods for producing such compounds and compositions.

The compounds contemplated in our invention are aryl mercury ammonium salts of halogenated phenols which are new organic mercury compounds of quaternary ammonium salt type wherein an aryl mercury group is attached to a nitrogen atom, having the following general formula:

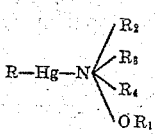

wherein R is an aryl group, $R_1$ is a phenyl radical substituted by at least three chlorine or bromine atoms, $R_2$ is a β-hydroxyalkyl radical having 2–3 carbon atoms and each of $R_3$ and $R_4$ is a β-hydroxyalkyl radical having 2–3 carbon atoms or lower alkyl radical having 1–4 carbon atoms.

The aforesaid compounds have desirable properties, including high potency or activity as bactericides and fungicides and at the same time, low toxicity to human beings, non-irritation to the human skin, high stability, colorlessness and odourlessness.

The most remarkable property of the new organic mercury compounds referred to above is that while they themselves are very difficultly soluble in water and not easily soluble in common organic solvents, they are rendered soluble, in the presence of a large excess of tertiary alkanolamine forming a constituent of the mercury compound, in water, common organic solvents or oils depending upon the structure so that the compound may be made a solution of a desired concentration in a desired solvent suitable for the preparation of desired composition.

Generally, in the presence of an excess of the said tertiary alkanolamine, the affinity or solubility of the organic mercury compound with or in polar solvents such as water and lower alcohols increases as the number of alkanol radicals in the compound increases, whereas the affinity or solubility of the compound with or in non-polar solvents such as aromatic hydrocarbons and petroleum solvents increases as the number of alkanol radicals decreases or the number of lower alkyl radicals in the compound increases.

According to the present invention, the new organic mercury compounds are produced by reacting aryl mercuric polyhalogeno-phenoxides which are known to be highly bacteriostatic and fungistatic and relatively low toxic with tertiary alkanolamines, said reaction being represented by the folowing equation:

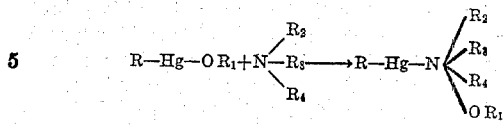

wherein R, $R_1$, $R_2$, $R_3$ and $R_4$ have the meanings given above.

Typical aryl mercuric polyhalogeno-phenoxides of the formula R—Hg—$OR_1$ (where R and $R_1$ have the meanings given above) which may be used in the practice of the present invention are illustrated, by way of example, as follows: phenyl mercuric pentachlorophenoxide, tolyl mercuric pentachlorophenoxide, phenyl mercuric tetrachlorophenoxide, phenyl mercuric trichlorophenoxide and phenyl mercuric tribromophenoxide.

Any suitable tertiary alkanolamine of the formula

where $R_2$, $R_3$ and $R_4$ have the meanings given above, may be used in producing compounds according to this invention, and included among them are, for instance, triethanolamine, methyldiethanolamine, ethyldiethanolamine, butyldiethanolamine, dimethylethanolamine, diethylethanolamine and dibutylethanolamine.

A common solvent for both of the reacting compounds may be employed to advantage. For example, alcohols, ketones, esters and aromatic hydrocarbons may be used but, among them, methanol, ethanol, acetone, methylethyl ketone and methylisobutylketone are preferably used together with or without water.

The reaction is completed by simply dissolving aryl mercuric polyhalogeno-phenoxide in a small excess of tertiary alkanolamine per mol of the phenoxide and the above mentioned solvent at room temperature or with moderate heating and under substantially atmospheric pressure. The compound resulting from the reaction is, as aforementioned, usually relatively insoluble as compared with the reacting components, and upon its precipitation may be filtered, washed and dried to obtain a colorless crystalline product. When the isolation of the reaction product is desired it is preferable to select and use a solvent in which the product is more difficultly soluble at ordinary temperature so as to facilitate the precipitation of the resulting compound. But if such isolation is unnecessary or not desired, further amounts or a large excess of the tertiary alkanolamine is used, as aforementioned, so that a solution containing the resulting new organic mercury compound is obtained. The latter method is very convenient in preparing various bactericides, germicides or fungicides for various known applications.

The new organic mercury compounds of quaternary ammonium salt type of the present invention thus obtained have high potency or activity as bactericides and fungicides and at the same time, remarkably low toxicity to human beings and non-irritation to the human skin. For example, the acute oral toxicity (in using mice) of phenylmercury triethanolammonium pentachlorophenoxide is $L_{D50}$ 742 mg. per kg. which is considerably lower than $L_{D50}$ 203 mg. per kg. of phenyl mercuric pentachlorophenoxide. For illustration of the potency of the compounds of the invention, the lowest concentrations of, for example, phenylmercury triethanolammonium pentachlorophenoxide giving 100% inhibition of *Staphylococcus aureus*, *Bacillus subtilis* and *Candida albicans* in incubation for 72 hours at 37° C. in a glucose-bouillon culture-medium are respectively 2 p.p.m., 8 p.p.m. and 0.5 p.p.m., and the lowest concentrations of the same compound giving 100% inhibition of *Aspergillus niger* and *Trichophyton rubrum* in incubation for two weeks at 28° C. in a glucose-peptone culture-medium are 2-3 p.p.m. and 1.25-2 p.p.m. respectively.

The compounds of the present invention are characterized further by the fact that they are very difficultly soluble in water, but are adsorptive to or affinitive with paper, pulp, textiles and the like. Therefore, once these compounds are applied to, in the form of solution, and penetrated into paper, pulp, textiles and the like, and then dried as usual the treated materials would exhibit a substantial laundry fastness or durability against washing, rinsing and rain.

The new organic mercury compounds of our invention may be used as a composition with various carriers or diluents, in the form of solution, powder, oily preparation, suspension, etc. In preparing such composition, it is not always necessary to isolate or is rather convenient not to isolate the resulting mercury compound from the products of the aforementioned reaction. Thus, when a water soluble preparation or composition is desired the reaction is carried out, for instance, in a methanol, ethanol or acetone solution containing a large excess of the tertiary alkanolamine e.g., triethanolamine and methyldiethanolamine. The resulting solution is soluble in water and gives a water diluted transparent solution which is useful as a bactericide or fungicide for various known uses and applications. When a powder form composition is desired, water soluble inert carriers, e.g., inorganic salts such as sodium sulphate, sodium bicarbonate, borax, or saccharides such as lactose, dextrin, soluble starch, etc. may be added to said resulting solution and the mixture is dried and pulverized into a powder form. It is also possible to use a suitable amount of suitable anionic or nonionic surfactants such as triethanolammonium oleate, polyethylene-glycol alkylphenylether, etc. to facilitate the solubility of the resulting organic mercury compound. These solutions or powders may be easily dissolved in and diluted with water for various commercial applications and uses. Thus, when textile fabrics, yarn, paper, pulp, bamboo or other cellulosic materials are treated with such aqueous solution containing, for example, about 0.025-0.05% by weight of the organic mercury compound of the present invention, by any suitable method such as spraying and dipping the said compound penetrates or permeates the materials and is absorbed thereby to render them washfast bacteriostatic or fungistatic. The aqueous solution is especially useful for the treatment of footwear to prevent the growth of bacteria and fungi. The solution may be used in coating composition such as emulsion paint and as germicides for agricultural use. When an oil soluble solution is desired, the aforesaid reaction is carried out by using a large excess of the tertiary alkanolamine, for instance, dimethylethanolamine, diethylethanolamine or dibutylethanolamine, and methylethylketone or methylisobutylketone as the solvent. The resulting concentrated solution (containing, for instance, 20-25% by weight of the quaternary ammonium salt type organic mercury compound formed) may be dissolved into a desired animal, vegetable or mineral oil, carbowax or the like. The said resulting concentrated solution may be added (for example, about 0.5%) to a paint, carbowax, leather oil or the like to render them bacteriostatic or fungistatic.

The amount of the new organic mercury compound to be contained as an essential active ingredient in the compositions or preparations as mentioned above is not critical and may be varied widely depending upon the uses or applications thereof. As aforementioned, the organic mercury compound has a high toxicity to fungi and bacteria and can be used in very diluted solution.

The invention is further illustrated by the following examples, it being understood that said examples are presented only as illustrative of the invention and not in limitation thereof.

Example 1

10 grams of phenyl mercuric pentachlorophenoxide and 6 grams of triethanolamine were added to 20 cc. of ethanol and the mixture was heated on a water bath for 5 minutes and the resulting solution was allowed to cool. To this solution was added ½ volume of water. A colorless crystalline precipitate separated on standing. The precipitate was filtered, washed with water, dried and recrystallized from ethyl acetate or acetone to yield 12 grams of a colorless prism melting at 147-149° C. It was phenyl mercury triethanolammonium pentachlorophenoxide having the formula:

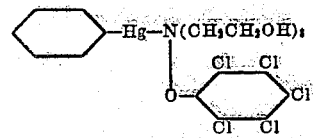

Analysis of hg.—Theory: 28.98%. Found: 29.35%; 28.51%.

Example 2

10 grams of phenyl mercuric pentachlorophenoxide, 10 grams of dimethylethanolamine and 20 cc. of ethanol were mixed and heated to complete solution. Upon allowing the resulting transparent solution to stand, crystals separated out. The precipitate was filtered, washed with ethanol and dried to yield 6 grams of a colorless prism melting at 156-157° C. It was phenyl mercury N,N-dimethylethanolammonium pentachlorophenoxide having the formula:

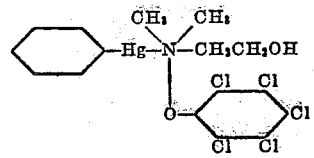

Example 3

10 grams of phenyl mercuric, 2,4,6-trichlorophenoxide, 10 grams of triethanolamine and 40 cc. of acetone were mixed together and heated to complete solution. Upon allowing the resulting transparent solution to stand, crystals separated out. The precpitate was filtered, washed with acetone and dried to yield 9 grams of a colorless prism melting at 142-144° C. It was phenyl mercury triethanolammonium 2,4,6-trichlorophenoxide having the formula:

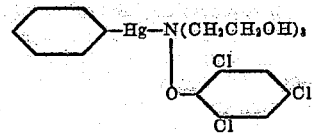

Example 4

10 grams of phenyl mercuric 2,3,4,6-tetrachlorophenoxide, 5 grams of dimethylaminoethanol and 20 cc. of benzene were mixed together and heated for 10 minutes to complete solution. Upon allowing the resulting transparent solution to stand, crystals separated out. The precipitate was filtered, washed with benzene and dried to yield 8 grams of a colorless plate melting at 153-154° C. It was phenyl mercury N, N-dimethylethanolammonium 2,3,4,6-tetrachlorophenoxide having the formula:

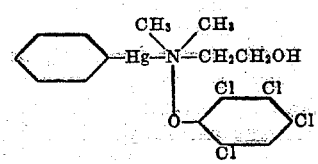

Example 5

10 grams of phenyl mercuric 2,4,6-tribromophenoxide, 10 grams of triethanolamine and 40 cc. of acetone were mixed together and heated for a few minutes to complete solution. Upon allowing the resulting transparent solution to stand, crystals separated out. The precipitate was filtered, washed with acetone and dried to yield 9.5 grams of a colorless prism melting at 139–141.5° C. It was phenyl mercury triethanolammonium 2,4,6-tribromophenoxide having the formula:

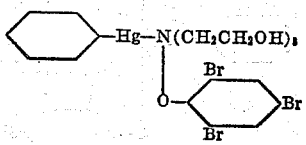

Example 6

7.5 grams of phenyl mercuric pentachlorophenoxide, 6 grams of methyldiethanolamine and 20 cc. of ethanol were mixed together and heated on a steam bath to complete solution. Upon allowing the resulting clear solution to stand, crystals separated out. The precipitate was filtered, washed with ethanol and dried to yield 8 grams of a colorless prism melting at 151–152° C. It was phenyl mercury N-methyldiethanolammonium pentachlorophenoxide having the formula:

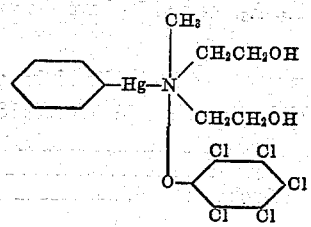

From the description of the specific examples given above, it will, of course, be apparent to those skilled in the art that other organic mercury compounds of quaternary ammonium salt type falling into the scope of the present invention may be prepared by using other aryl mercuric polyhalogeno phenoxides and (or) other tertiary alkanolamines whose formulas are given hereinbefore.

The new organic mercury compounds thus isolated are highly toxic to bacteria and fungi and may be widely used as fungicides and bactericides for various known uses. For example, the compounds may be directly admixed with paints, soaps, cosmetics, polishes and the like with or without a carrier or diluent. The compounds may be made a solution in the presence of a large excess of alkanolamines as hereinbefore mentioned and the solution may be diluted with any desired amount of water and other common solvents for various known commercial applications and uses.

In the following examples there are shown, by way of illustration, the cases where the resulting organic mercury compounds are not isolated and prepared in the form of solution, paste or powder.

Example 7

1 part of phenyl mercuric pentachlorophenoxide, 1 part of diethylethanolamine and 3 parts of methyl isobutyl ketone were mixed together and stirred to obtain a pale yellow clear solution containing phenyl mercury N,N-diethylethanolammonium pentachlorophenoxide. The solution was capable of being homogeneously mixed with ketones, esters, aromatic hydrocarbons, mineral oils, animal oils, vegetable oils, hydrogenated oils and carbowax. 1–1.5% addition of the said solution to various oil-paints and resin-paints completely inhibited the growth of Mucor hiemalis, Aspergillus niger, Penicillium glaucum and Rhizopus nigricans, in incubation for 15 days at 30° C. by Vicklund's filter paper method.

1% of the said solution was added to various oil-paints, resin-paints, leather oil and other oily coating compositions to render them bacteriostatic, fungistatic or mildew resistant.

Example 8

2 parts of methylethylketone were added to and dissolved in 1 part of dimethylethanolamine, and 1 part of phenyl mercuric 2,4,6-trichlorophenoxide was added thereto. The mixture was stirred to complete solution. Thus, a solution containing phenyl mercury N,N-dimethylethanolammonium-2,4,6-tridichlorophenoxide was added. In this solution was dissolved 6 parts of hydrogenated or solidified beef tallow and heated to complete solution. Upon cooling the solution there was obtained a paste composition. 1–2% addition of this composition to leather oil and polishing preparations rendered them mildew resistant.

Example 9

1 part of tolyl mercuric pentachlorophenoxide (mixture of p-tolyl mercuric and o-tolyl mercuric pentachlorophenoxides), 1 part of N,N-dibutylethanolamine and 3 parts of methyl isobutyl ketone were mixed together and stirred to obtain a pale yellow clear solution containing tolyl mercury N,N-dibutylethanolammonium pentachlorophenoxide. 1–1.5% addition of this solution to oil-paints, resin-paints, leather oil and other oily coating compositions rendered them mildew resistant.

Example 10

24 parts of methyl isobutyl ketone were added to a mixture of 20 parts of phenyl mercuric pentachlorophenoxide, 6.5 parts of triethanolamine, 5.0 parts of oleic acid and 44.5 parts of polyethyleneglycol alkylphenyl ether. There was a colorless clear solution containing phenyl mercury triethanolammonium pentachlorophenoxide. 0.5 to 1% addition of this solution to an emulsion paint gave it fungistatic and bacteriostatic properties. This solution may be diluted with any desired amount of water to give a clear aqueous solution, which may be used as bactericidal and fungicidal composition for various known applications and uses such as for treatment of textiles, paper, leather and many other articles to render them bacteriostatic, fungistatic or mildew resistant.

Example 11

5 parts of phenyl mercuric pentachlorophenoxide were added to a mixture of 3 parts of triethanolamine and 10 parts of methanol, and mildly heated to complete solution. To the solution containing phenyl mercury triethanolammonium pentachlorophenoxide thus obtained, were added 6 parts of polyethyleneglycol alkylphenyl ether, 46 parts of lactose and 40 parts of borax. The whole was thoroughly mined and upon evaporation of methanol there was obtained a slightly yellowish powder. The powder was water soluble. Into a 0.5–1% aqueous solution of this powder, textile fabrics such as of nylon, cotton and rayon, or other cellulosic materials such as paper, bamboo, wood, etc. were dipped and then dried. Since the phenyl mercury triethanolammonium pentachlorophenoxide is substantially insoluble in water and other common solvents, the articles thus treated are rendered washfast bacteriostatic, fungistatic and mildew resistant. This aqueous solution is particularly useful in treating footwear to render the same bacteriostatic and fungistatic.

We claim:

1. A compound of the general formula

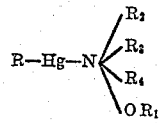

wherein R is an aryl group, $R_1$ is a phenyl radical substituted by at least three of a halogen atom selected from the group consisting of chlorine and bromine, $R_2$ is a β-hydroxyalkyl radical having 2–3 carbon atoms, and $R_3$ and $R_4$ are selected from the group consisting of β-hydroxyalkyl radicals having 2–3 carbon atoms and lower alkyl radicals having 1–4 carbon atoms.

2. The compound represented by the formula

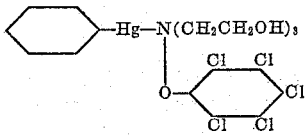

3. The compound represented by the formula

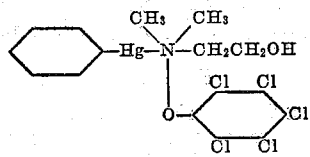

4. The compound represented by the formula

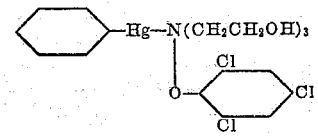

5. The compound represented by the formula

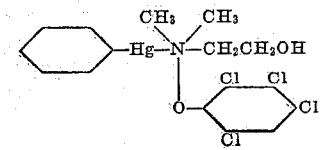

6. The compound represented by the formula

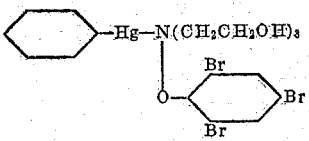

7. The compound represented by the formula

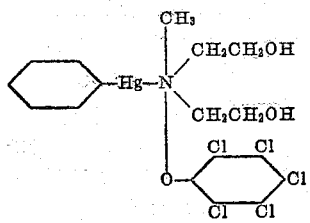

8. Process for the preparation of compounds of claim 1 which comprises reacting a compound of the formula:

$$R\text{—}Hg\text{—}OR_1$$

with a compound of the formula:

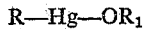

in which R, $R_1$, $R_2$, $R_3$ and $R_4$ have the meanings given above.

References Cited in the file of this patent

UNITED STATES PATENTS

| | | |
|---|---|---|
| 2,411,815 | Sowa | Nov. 26, 1946 |
| 2,423,262 | Sowa | July 1, 1947 |
| 2,686,119 | Buckman et al. | Aug. 10, 1954 |